US012761925B2

(12) United States Patent
Chung

(10) Patent No.: US 12,761,925 B2
(45) Date of Patent: Oct. 13, 2026

(54) METHOD FOR POWER-ON SELF-TEST PROCESS OF COMPUTER SYSTEM

(71) Applicant: Mitac Computing Technology Corporation, Taoyuan City (TW)

(72) Inventor: Chia-Hang Chung, Taoyuan City (TW)

(73) Assignee: Mitac Computing Technolgy Corporation, Taoyuan City (TW)

(*) Notice: Subject to any disclaimer, the term of this patent is extended or adjusted under 35 U.S.C. 154(b) by 138 days.

(21) Appl. No.: 18/988,485

(22) Filed: Dec. 19, 2024

(65) Prior Publication Data

US 2025/0306947 A1 Oct. 2, 2025

(30) Foreign Application Priority Data

Apr. 2, 2024 (TW) ................................ 113112478

(51) Int. Cl.
*G06F 15/177* (2006.01)
*G06F 9/00* (2018.01)
*G06F 9/4401* (2018.01)

(52) U.S. Cl.
CPC .................................. *G06F 9/4401* (2013.01)

(58) Field of Classification Search
CPC ..................................................... G06F 9/4401
See application file for complete search history.

(56) References Cited

U.S. PATENT DOCUMENTS

| | | | | |
|---|---|---|---|---|
| 7,251,723 B2 * | 7/2007 | Lam | G06F 11/1417 711/120 |
| 9,542,195 B1 * | 1/2017 | Astarabadi | G06F 11/1417 |
| 2008/0229158 A1 * | 9/2008 | Saito | G06F 11/0757 714/E11.004 |
| 2015/0331754 A1 * | 11/2015 | Grobelny | G06F 11/1438 714/23 |
| 2016/0328300 A1 * | 11/2016 | Rahardjo | G06F 11/1417 |
| 2024/0118966 A1 * | 4/2024 | Sayyed | G06F 11/0757 |
| 2024/0211350 A1 * | 6/2024 | Bhatia | G06F 9/4406 |
| 2024/0220367 A1 * | 7/2024 | Hiremath | G06F 9/4401 |
| 2025/0028601 A1 * | 1/2025 | Bhatia | G06F 9/4401 |
| 2026/0169928 A1 * | 6/2026 | Asaro | G06F 12/1408 |

* cited by examiner

*Primary Examiner* — Xuxing Chen
(74) *Attorney, Agent, or Firm* — MLO, professional corp.

(57) ABSTRACT

A method is to be implemented by a baseboard management controller included in a computer system, and includes: upon receiving a power-on signal, loading one of a default basic input/output system (BIOS) image and a golden BIOS image stored in the computer system, and simultaneously starting first and second timers; determining whether a power-on self-test (POST) code is received via a first specific interface before the first timer times out; executing a BIOS recovery procedure when no POST code is received via the first specific interface before the first timer times out; determining whether a signal received via a second specific interface has one of a rising edge and a falling edge before the second timer times out; and executing the BIOS recovery procedure when the signal received via the second specific interface has neither the rising edge nor the falling edge before the second timer times out.

9 Claims, 3 Drawing Sheets

METHOD FOR POWER-ON SELF-TEST PROCESS OF COMPUTER SYSTEM

CROSS-REFERENCE TO RELATED APPLICATION

This application claims priority to Taiwanese Invention Patent Application No. 113112478, filed on Apr. 2, 2024, and incorporated by reference herein in its entirety.

FIELD

The disclosure relates to a method for a power-on self-test (POST) process of a computer system, and more particularly to a method for a POST process of a computer system that supports the dual basic input/output system (BIOS).

BACKGROUND

For a computer system that supports the single basic input/output system (BIOS) (hereinafter also referred to as the single-BIOS computer) and stores a single BIOS image, the single BIOS image would be a single point of failure. That is to say, the single-BIOS computer would fail to boot once the single BIOS image is damaged due to malware attacks of malicious software or a failed BIOS update. A complicated recovery procedure is required for fixing the single-BIOS computer in which the single BIOS image was damaged, and data loss may occur during the recovery procedure.

In view of the aforementioned issues raised in the single BIOS, a notion of the dual BIOS is proposed. A computer system supporting the dual BIOS (hereinafter also referred to as the dual-BIOS computer) stores a primary BIOS image and a backup BIOS image. When the primary BIOS image is abnormal, the backup BIOS image is used as a backup to replace the primary BIOS image. In this way, a risk of failure in a boot process of the dual-BIOS computer due to abnormalities that occur in only one of the primary BIOS image and the backup BIOS image may be reduced. Conventionally, only a single interface is involved in a power-on self-test (POST) process of the dual-BIOS computer, and thus errors in the primary BIOS image and the backup BIOS image may not be thoroughly and correctly checked.

SUMMARY

Therefore, an object of the disclosure is to provide a method for a power-on self-test (POST) process of a computer system that can alleviate at least one of the drawbacks of the prior art.

According to the disclosure, the computer system includes a baseboard management controller (BMC). The computer system supports dual basic input/output system (BIOS) and stores a default BIOS image and a golden BIOS image. The computer system supports a first specific interface and a second specific interface that are different from each other. The method is to be implemented by the BMC, and includes steps of:

- upon receiving a power-on signal, loading one of the default BIOS image and the golden BIOS image, and simultaneously starting a first timer that is configured to count a first preset timeout period and a second timer that is configured to count a second preset timeout period which is longer than the first preset timeout period;
- determining whether a POST code is received via the first specific interface before the first timer times out;
- executing a BIOS recovery procedure in response to determining that no POST code is received via the first specific interface before the first timer times out;
- determining whether a signal received via the second specific interface has one of a rising edge and a falling edge before the second timer times out; and
- executing the BIOS recovery procedure in response to determining that the signal received via the second specific interface has neither the rising edge nor the falling edge before the second timer times out.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
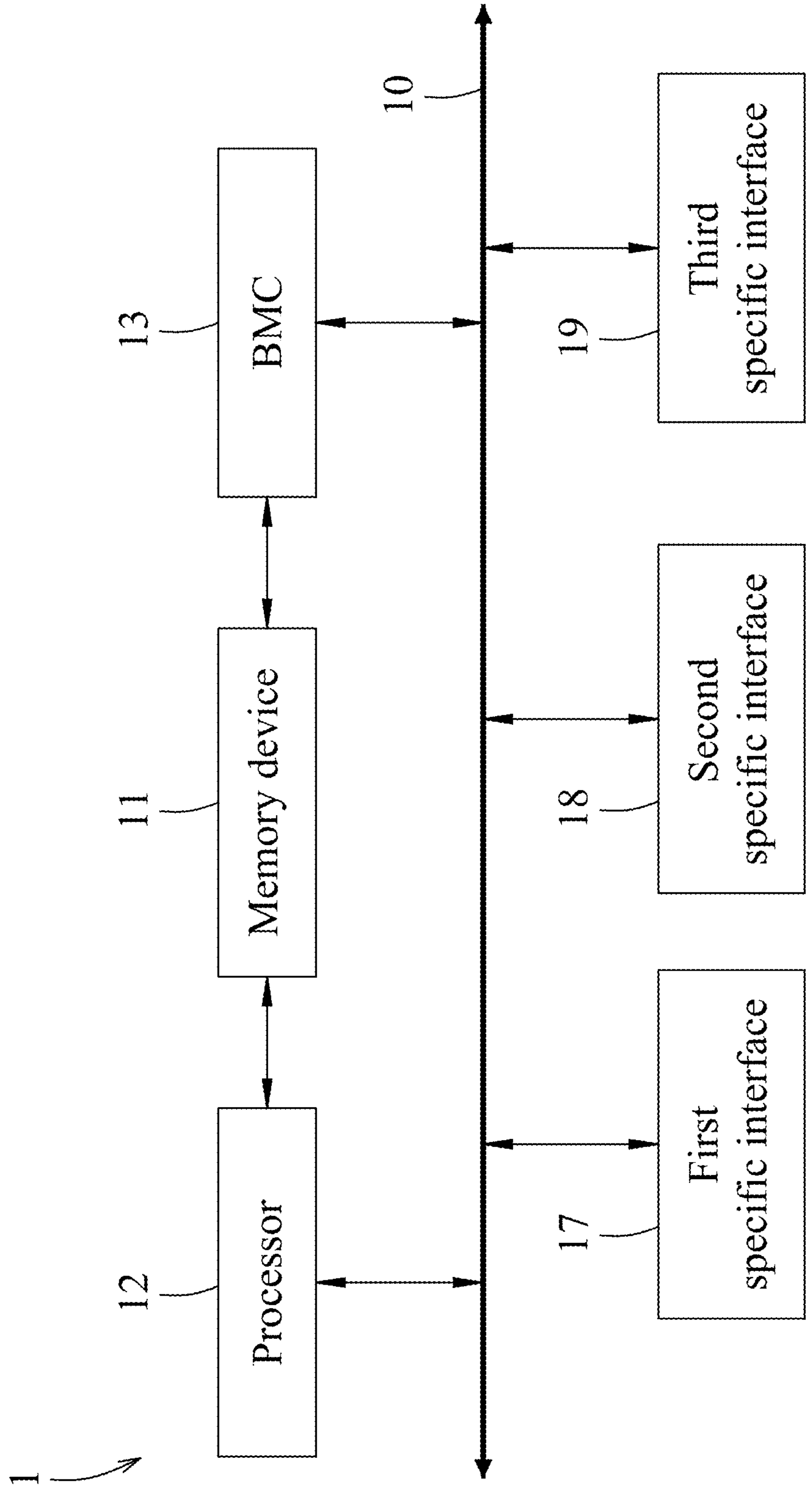
FIG. 1 is a block diagram illustrating a computer system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a computer system 1 according to an embodiment of the disclosure is illustrated. The computer system 1 supports dual basic input/output system (BIOS). The computer system 1 may be implemented to be a desktop computer, a laptop computer, a notebook computer, a tablet computer, a computing server, a data server or an embedded system, but implementation thereof is not limited to what are disclosed herein and may vary in other embodiments.

The computer system 1 includes a memory device 11, a processor 12 and a baseboard management controller (BMC) 13. The memory device 11 is electrically connected to the processor 12 and the BMC 13.

The processor 12 may be implemented by a central processing unit (CPU), a microprocessor, a micro control unit (MCU), a System on a Chip (SoC), or any circuit configurable/programmable in a software manner and/or hardware manner to implement functionalities discussed in this disclosure.

The memory device 11 may be implemented by a non-volatile memory (NVM) device such as read only memory (ROM), programmable ROM (PROM), flash memory, a hard disk drive (HDD), a solid state disk (SSD), or electrically-erasable programmable read-only memory (EEPROM), but is not limited thereto. The memory device 11 is configured to store a default BIOS image and a golden BIOS image. Moreover, the memory device 11 is further configured to store a first timer, a second timer and a watchdog timer. In this embodiment, each of the first timer, the second timer and the watchdog timer is implemented to be software, but implementation of the first timer, the second timer and the watchdog timer is not limited to the disclosure herein and may vary in other embodiments. For example, each of the first timer, the second timer and the watchdog timer may be implemented to be hardware in some embodiments.

The first timer is configured to count a first preset timeout period. The second timer is configured to count a second preset timeout period that is longer than the first preset timeout period. The watchdog timer is configured to count a predetermined watchdog timeout period that is longer than the first preset timeout period but shorter than the second preset timeout period. In this embodiment, the first preset timeout period is exemplarily 10 seconds, the second preset timeout period is exemplarily 900 seconds, and the predetermined watchdog timeout period is exemplarily 720 seconds, but the first preset timeout period, the second preset timeout period and the predetermined watchdog timeout period are not limited to the disclosure herein and may vary in other embodiments. It is worth to note that after being started, each of the first timer, the second timer and the watchdog timer is configured to count down the corresponding one of the first preset timeout period, the second preset timeout period and the predetermined watchdog timeout period, respectively. Said each of the first timer, the second timer and the watchdog timer would have counted down to zero (i.e., would have timed out) when the corresponding one of the first preset timeout period, the second preset timeout period and the predetermined watchdog timeout period has elapsed and said each of the first timer, the second timer and the watchdog timer has not been restarted, paused or stopped. Such situation is known as a timeout event. In some embodiments, in response to occurrence of the timeout event, said each of the first timer, the second timer and the watchdog timer is configured to generate a timeout signal for initiating corrective actions (e.g., to place the computer system 1 in a safe state and to invoke a reboot procedure of the computer system 1).

The computer system 1 supports a system management bus (SMBus) 10. The processor 12 is capable of communicating with the BMC 13 via the SMBus 10. The computer system 1 further supports a first specific interface 17, a second specific interface 18 and a third specific interface 19 that are different from each other. The first specific interface 17, the second specific interface 18 and the third specific interface 19 are electrically connected to the SMBus 10. In this embodiment, the first specific interface 17 may be implemented by the enhanced serial peripheral interface (eSPI) or the Low Pin Count (LPC) interface; the second specific interface 18 may be implemented by a general purpose input/output (GPIO) interface; and the third specific interface 19 may be implemented to support specifications of the intelligent platform management interface (IPMI). However, implementation of the first specific interface 17, the second specific interface 18 and the third specific interface 19 is not limited to the disclosure herein and may vary in other embodiments.

Figure 2:
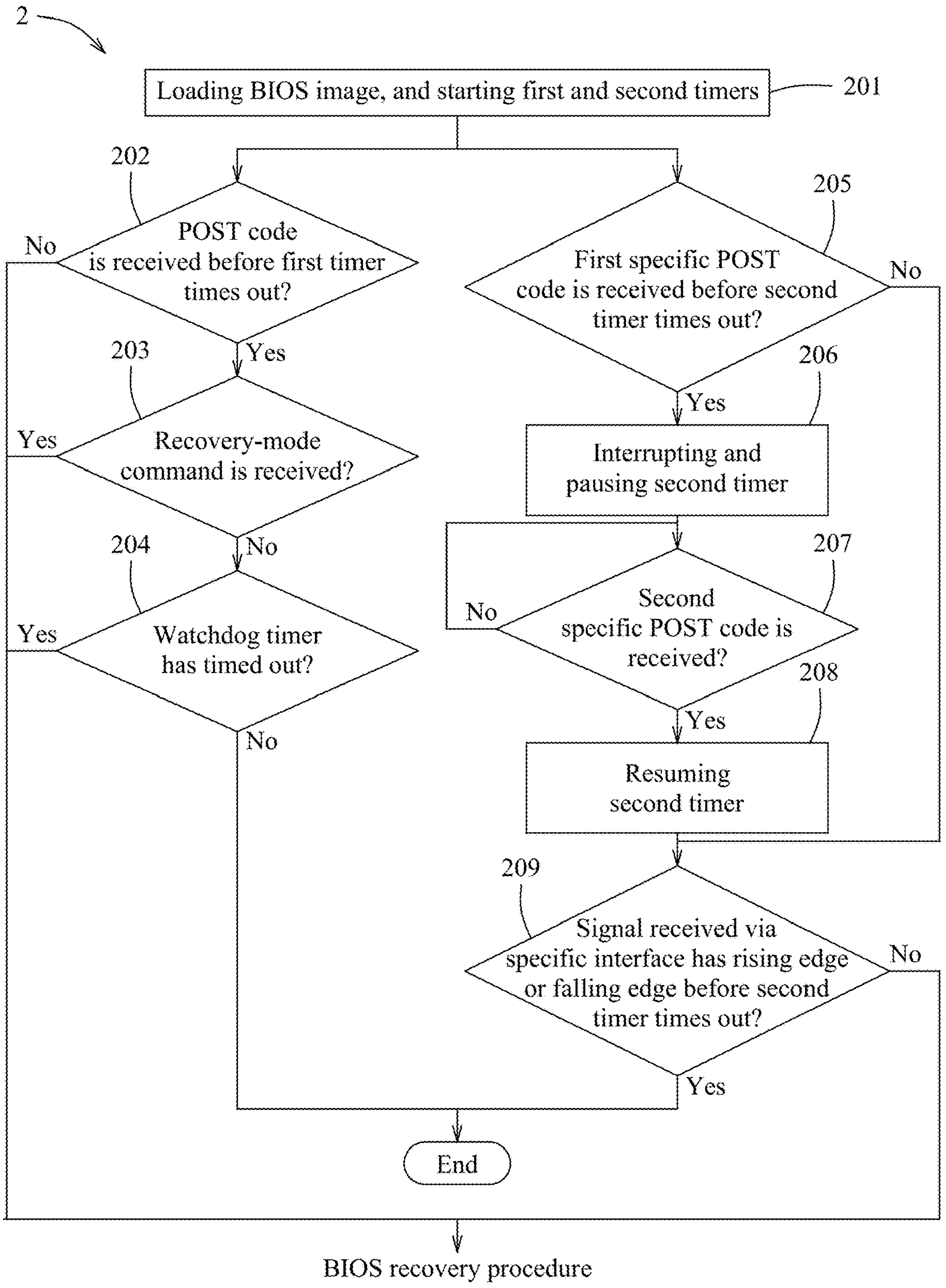
FIGS. 2 and 3 cooperatively illustrate a flow chart of a method for a power-on self-test (POST) process of the computer system according to an embodiment of the disclosure.
Figure 3:
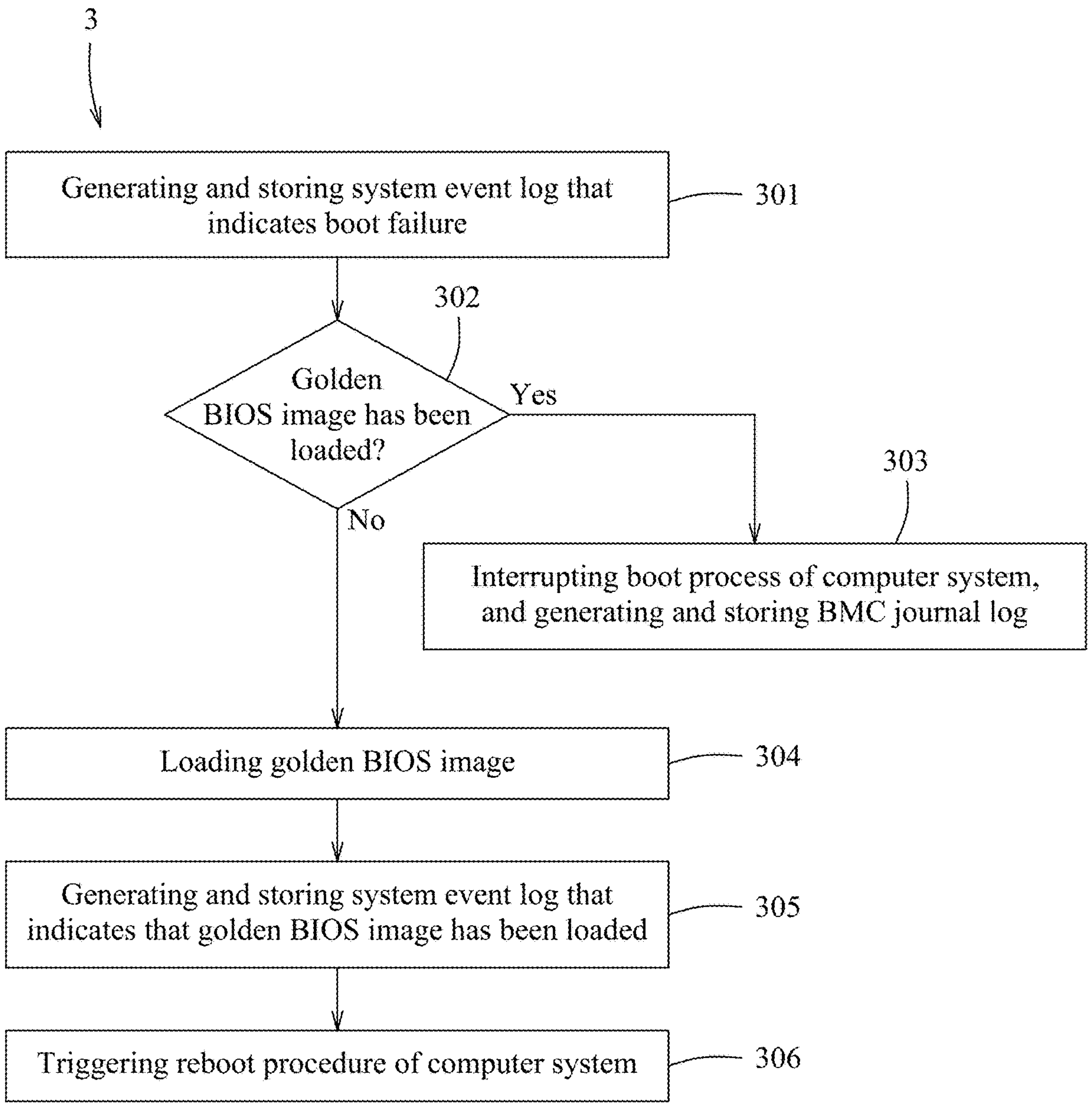

Referring to FIGS. 2 and 3, a method for a power-on self-test (POST) process of the computer system 1 according to an embodiment of the disclosure is illustrated. The method is to be implemented by the BMC 13. The method includes a checking procedure 2 and a BIOS recovery procedure 3. The checking procedure 2 includes steps 201 to 209 delineated below.

In step 201, upon receiving a power-on signal, the BMC 13 loads one of the default BIOS image and the golden BIOS image, and simultaneously starts the first timer and the second timer. It is worth to note that the power-on signal may be sent from a power management circuit, a remote tool (which may be realized by hardware or software), or a specific hardware device, but it is not limited thereto. Then, a sub-procedure in steps 202 to 204 and a sub-procedure in steps 205 to 209 are executed in parallel.

In step 202, the BMC 13 determines whether a POST code is received via the first specific interface 17 before the first timer times out. In response to determining that no POST code is received via the first specific interface 17 before the first timer times out, the BMC 13 executes the BIOS recovery procedure 3 (see FIG. 3). It is worth to note that in some embodiments, corrective actions would be initiated in response to determining that the first timer times out. Otherwise, in response to determining that a POST code is received via the first specific interface 17 before the first timer times out, a procedure flow of the method proceeds to step 203.

It is worth to note that the POST process of the computer system 1 usually includes a plurality of stages, and the computer system 1 generates, in the POST process, a plurality of POST codes that respectively indicate the stages of the POST process. Then, the processor 12 of the computer system 1 sends the POST codes via the first specific interface 17 to the BMC 13.

In step 203, the BMC 13 determines whether a recovery-mode command is received via the third specific interface 19, where the recovery-mode command is used for entering a recovery mode. In response to determining that the recovery-mode command is received via the third specific interface 19, the BMC 13 executes the BIOS recovery procedure 3. On the other hand, in response to determining that the recovery-mode command is not received via the third specific interface 19, the procedure flow of the method proceeds to step 204.

It is worth to note that in the POST process of the computer system 1, a BIOS code executed by the processor 12 enables the processor 12 to determine whether or not to enter the recovery mode. The processor 12 would send the recovery-mode command via the third specific interface 19 to the BMC 13 when it is determined to enter the recovery mode.

In step 204, the BMC 13 determines whether the watchdog timer has timed out. The BMC 13 executes the BIOS recovery procedure 3 in response to determining that the watchdog timer has timed out.

It is worth to note that the watchdog timer is often used to implement fault resilient booting level 2 (FRB-2), and thus the watchdog timer is also called as the FRB-2 timer. The BIOS code executed by the processor 12 in the POST process defines when to start the watchdog timer and when to interrupt the watchdog timer.

In step 205, the BMC 13 determines whether a first specific POST code is received via the first specific interface 17 before the second timer times out. In response to determining that the first specific POST code is received via the first specific interface 17 before the second timer times out, the procedure flow proceeds to step 206. Oppositely, in response to determining that the first specific POST code is not received via the first specific interface 17 before the second timer times out, the procedure flow proceeds to step 209. It is worth to note that in some embodiments, corrective actions would be initiated in response to determining that the second timer times out.

In step 206, the BMC 13 interrupts and pauses the second timer, and then implements step 207.

In step 207, the BMC 13 determines whether a second specific POST code is received via the first specific interface 17. In response to determining that the second specific POST code is received via the first specific interface 17, the procedure flow proceeds to step 208. Contrarily, in response to determining that the second specific POST code is not received via the first specific interface 17, the BMC 13 repeats the step of determining whether a second specific POST code is received via the first specific interface 17 until the BMC 13 determines that the second specific POST code is received via the first specific interface 17.

In step 208, the BMC 13 resumes the second timer and implements step 209.

It is worth to note that in this embodiment, the first specific POST code is a code indicating that a test mode has been entered (i.e., the processor 12 is in the test mode), and the second specific POST code is a code indicating that the test mode has been existed (i.e., the processor 12 has left the test mode). In other words, the processor 12 would send the first specific POST code via the first specific interface 17 to the BMC 13 when the processor 12 enters the test mode, so as to enable the BMC 13 to interrupt and pause the second timer when the processor 12 is running in the test mode. Later, the processor 12 would send the second specific POST code via the first specific interface 17 to the BMC 13 when the processor 12 leaves the test mode, so as to enable the BMC 13 to resume the second timer and to execute further steps. However, the first specific POST code and the second specific POST code are not limited to the disclosure herein and may vary in other embodiments.

In step 209, the BMC 13 determines whether a signal received via the second specific interface 18 has one of a rising edge and a falling edge before the second timer times out. In response to determining that the signal received via the second specific interface 18 has neither the rising edge nor the falling edge before the second timer times out, the BMC 13 executes the BIOS recovery procedure 3. It is worth to note that in some embodiments, corrective actions would be initiated in response to determining that the second timer times out.

When the BMC 13 determines in step 204 that the watchdog timer has not timed out, and at the same time, determines in step 209 that the signal received via the second specific interface 18 has either the rising edge or the falling edge before the second timer times out, the procedure flow goes to an end. Such situation implies that the POST process of the computer system 1 has been completed.

It is worth to note that in some variant embodiments of the method, the checking procedure 2 may not include step 203 and/or step 204. Since such variant embodiments are similar to the embodiment that is previously described, similar descriptions are not repeated, and only differences therebetween are explained in the following paragraphs for the sake of brevity.

In a variant embodiment of the method where step 203 is omitted, in response to determining in step 202 that a POST code is received via the first specific interface 17 before the first timer times out, the procedure flow proceeds to step 204.

In a variant embodiment of the method where step 204 is omitted, when the BMC 13 determines in step 203 that the recovery-mode command is not received via the third specific interface 19, and at the same time, determines in step 209 that the signal received via the second specific interface 18 has either the rising edge or the falling edge before the second timer times out, the procedure flow goes to the end.

In a variant embodiment of the method where steps 203 and 204 are both omitted, when the BMC 13 determines in step 202 that a POST code is received via the first specific interface 17 before the first timer times out, and at the same time, determines in step 209 that the signal received via the second specific interface 18 has either the rising edge or the falling edge before the second timer times out, the procedure flow goes to the end.

Referring to FIG. 3, the BIOS recovery procedure 3 includes steps 301 to 306 delineated below.

In step 301, the BMC 13 generates and stores, in the memory device 11, a system event log that indicates a boot failure.

In step 302, the BMC 13 determines whether the golden BIOS image has been loaded or not. In response to determining that the golden BIOS image has been loaded, the procedure flow proceeds to step 303. On the other hand, in response to determining that the golden BIOS image has not been loaded, the procedure flow proceeds to step 304.

In step 303, the BMC 13 interrupts a boot process of the computer system 1, and generates and stores a BMC journal log in the memory device 11. As a reference for troubleshooting, the BMC journal log records a history of all operations performed by the BMC 13 before the BMC 13 generates the BMC journal log, and the BMC journal log records timestamps respectively of the operations. The computer system 1 interrupted by the BMC 13 would stay in a pause state for being further inspected and fixed by a development specialist or a maintenance staff.

In step 304, the BMC 13 loads the golden BIOS image to replace the default BIOS image.

In step 305, the BMC 13 generates and stores, in the memory device 11, a system event log that indicates that the golden BIOS image has been loaded.

In step 306, the BMC 13 notifies the processor 12 so as to trigger the reboot procedure of the computer system 1.

In one embodiment, a computer system 1 includes a BMC 13, supports a dual BIOS and stores a default BIOS image and a golden BIOS image. The computer system 1 supports a first specific interface 17 and a second specific interface 18 that are different from each other. The computer system 1 further supports a third specific interface 19 that is different from the first specific interface 17 and the second specific interface 18. A method for a POST process is to be implemented by the BMC 13, and includes steps of: upon receiving a power-on signal, loading one of the default BIOS image and the golden BIOS image, and simultaneously starting a first timer that is configured to count a first preset timeout period and a second timer that is configured to count a second preset timeout period which is longer than the first preset timeout period; and implementing a first parallel procedure and a second parallel procedure that are executed in parallel.

The first parallel procedure includes steps of determining whether a POST code is received via the first specific interface 17 before the first timer times out, and executing a BIOS recovery procedure in response to determining that no POST code is received via the first specific interface 17 before the first timer times out. The first parallel procedure further includes steps of, in response to determining that a POST code is received via the first specific interface 17 before the first timer times out, determining whether a recovery-mode command is received via the third specific interface 19, and executing the BIOS recovery procedure in response to determining that the recovery-mode command is received via the third specific interface 19. The first parallel procedure further includes steps of, in response to determining that the recovery-mode command is not received via the third specific interface 19, determining whether a watchdog timer that is configured to count a predetermined watchdog timeout period has timed out, wherein the predetermined watchdog timeout period is longer than the first preset timeout period but shorter than the second preset timeout period. The first parallel procedure further includes a step of executing the BIOS recovery procedure in response to determining that the watchdog timer has timed out.

The second parallel procedure includes steps of determining whether a signal received via the second specific interface 18 has one of a rising edge and a falling edge before the second timer times out, and executing the BIOS recovery procedure in response to determining that the signal received via the second specific interface 18 has neither the rising edge nor the falling edge before the second timer times out. The second parallel procedure further includes steps of, before determining whether a signal received via the second specific interface 18 has one of a rising edge and a falling edge before the second timer times out, determining whether a first specific POST code is received via the first specific interface 17 before the second timer times out, and in response to determining that the first specific POST code is not received via the first specific interface 17 before the second timer times out, implementing the step of determining whether a signal received via the second specific interface 18 has one of a rising edge and a falling edge before the second timer times out. The second parallel procedure further includes steps of in response to determining that the first specific POST code is received via the first specific interface 17 before the second timer times out, interrupting and pausing the second timer, and determining whether a second specific POST code is received via the first specific interface 17. The second parallel procedure further includes a step of, in response to determining that the second specific POST code is not received via the first specific interface 17, repeating the step of determining whether a second specific POST code is received via the first specific interface 17. The second parallel procedure further includes steps of in response to determining that the second specific POST code is received via the first specific interface 17, resuming the second timer and implementing the step of determining whether a signal received via the second specific interface 18 has one of a rising edge and a falling edge before the second timer times out.

To sum up, in the method for the POST process of the computer system 1 supporting the dual BIOS according to the disclosure, the BMC 13 is utilized to determine whether any abnormality exists in two BIOS images (i.e., the default BIOS image and the golden BIOS image) through checking whether or not the computer system 1 successfully completes the POST process, and to execute the BIOS recovery procedure 3 when it is determined that an abnormality exists in the two BIOS images. In particular, three timers (i.e., the first timer, the second timer and the watchdog timer) and three interfaces (i.e., the first specific interface 17, the second specific interface 18 and the third specific interface 19) are utilized to implement the aforesaid check. In this way, errors in the two BIOS images may be thoroughly and correctly checked. It is worth to note that, in order to prevent mistaken determination in which an abnormality exists in the two BIOS images due to occurrence of the timeout event of the second timer, and which may be caused by an overly-long execution time period of the processor 12 for testing, the BMC 13 is implemented to interrupt and pause the second timer in response to determining that the first specific POST code is received via the first specific interface 17 before the second timer times out.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for a power-on self-test (POST) process of a computer system that includes a baseboard management controller (BMC), the computer system supporting dual basic input/output system (BIOS) and storing a default BIOS image and a golden BIOS image, the computer system supporting a first specific interface and a second specific interface that are different from each other, the method to be implemented by the BMC and comprising steps of:

upon receiving a power-on signal, loading one of the default BIOS image and the golden BIOS image, and simultaneously starting a first timer that is configured to count a first preset timeout period and a second timer that is configured to count a second preset timeout period which is longer than the first preset timeout period;

determining whether a POST code is received via the first specific interface before the first timer times out;

executing a BIOS recovery procedure in response to determining that no POST code is received via the first specific interface before the first timer times out;

determining whether a signal received via the second specific interface has one of a rising edge and a falling edge before the second timer times out; and executing the BIOS recovery procedure in response to determining that the signal received via the second specific interface has neither the rising edge nor the falling edge before the second timer times out.

2. The method as claimed in claim 1, the computer system further supporting a third specific interface that is different from the first specific interface and the second specific interface, the method further comprising steps of, in response to determining that a POST code is received via the first specific interface before the first timer times out:

determining whether a recovery-mode command is received via the third specific interface; and executing the BIOS recovery procedure in response to determining that the recovery-mode command is received via the third specific interface.

3. The method as claimed in claim 2, further comprising steps of, in response to determining that the recovery-mode command is not received via the third specific interface:

determining whether a watchdog timer that is configured to count a predetermined watchdog timeout period has timed out, the predetermined watchdog timeout period being longer than the first preset timeout period but shorter than the second preset timeout period; and executing the BIOS recovery procedure in response to determining that the watchdog timer has timed out.

4. The method as claimed in claim 1, further comprising steps of, before determining whether a signal received via the second specific interface has one of a rising edge and a falling edge before the second timer times out:

determining whether a first specific POST code is received via the first specific interface before the second timer times out;

in response to determining that the first specific POST code is not received via the first specific interface before the second timer times out, implementing the step of determining whether a signal received via the second specific interface has one of a rising edge and a falling edge before the second timer times out; and in response to determining that the first specific POST code is received via the first specific interface before the second timer times out, interrupting and pausing the second timer, determining whether a second specific POST code is received via the first specific interface, in response to determining that the second specific POST code is not received via the first specific interface, repeating the step of determining whether a second specific POST code is received via the first specific interface, and in response to determining that the second specific POST code is received via the first specific interface, resuming the second timer and implementing the step of determining whether a signal received via the second specific interface has one of a rising edge and a falling edge before the second timer times out.

5. The method as claimed in claim 4, wherein the first specific POST code is a code indicating that a test mode has been entered, and the second specific POST code is a code indicating that the test mode has been existed.

6. The method as claimed in claim 1, wherein the BIOS recovery procedure includes steps of:

determining whether the golden BIOS image has been loaded or not;

loading the golden BIOS image in response to determining that the golden BIOS image has not been loaded; and triggering a reboot procedure of the computer system.

7. The method as claimed in claim 6, wherein the BIOS recovery procedure further includes a step of, prior to determining whether the golden BIOS image has been loaded or not:

generating and storing a system event log that indicates a boot failure.

8. The method as claimed in claim 6, wherein the BIOS recovery procedure further includes a step of, after loading the golden BIOS image:

generating and storing a system event log that indicates that the golden BIOS image has been loaded.

9. The method as claimed in claim 6, wherein the BIOS recovery procedure further includes steps of, in response to determining that the golden BIOS image has been loaded:

interrupting a boot process of the computer system; and generating and storing a BMC journal log.

* * * * *